US010143036B2

(12) United States Patent
Khan

(10) Patent No.: US 10,143,036 B2
(45) Date of Patent: Nov. 27, 2018

(54) MILLIMETER WAVE WIRELESS SYSTEM USING LICENSED AND UNLICENSED FREQUENCY SPRECTRUM

(71) Applicant: Phazr, Inc., Allen, TX (US)

(72) Inventor: Farooq Khan, Allen, TX (US)

(73) Assignee: Phazr, Inc., Allen, TX (US)

( * ) Notice: Subject to any disclaimer, the term of this patent is extended or adjusted under 35 U.S.C. 154(b) by 44 days.

(21) Appl. No.: 15/644,553

(22) Filed: Jul. 7, 2017

(65) Prior Publication Data

US 2018/0035487 A1 Feb. 1, 2018

Related U.S. Application Data

(60) Provisional application No. 62/369,038, filed on Jul. 30, 2016.

(51) Int. Cl.
*H04W 84/04* (2009.01)
*H04W 74/00* (2009.01)
*H04W 84/00* (2009.01)
*H04W 92/20* (2009.01)
*H04W 80/02* (2009.01)
*H04W 88/06* (2009.01)
*H04B 7/02* (2018.01)
*H04W 74/08* (2009.01)

(52) U.S. Cl.
CPC ............ *H04W 84/045* (2013.01); *H04B 7/02* (2013.01); *H04W 74/006* (2013.01); *H04W 80/02* (2013.01); *H04W 84/005* (2013.01); *H04W 84/04* (2013.01); *H04W 88/06* (2013.01); *H04W 92/20* (2013.01); *H04W 74/0816* (2013.01)

(58) Field of Classification Search
CPC . H04W 74/006; H04W 80/02; H04W 84/005; H04W 84/04; H04W 84/045; H04W 88/06; H04W 92/20; H04W 74/0816; H04B 7/02
See application file for complete search history.

(56) References Cited

U.S. PATENT DOCUMENTS

| 10,057,898 | B2 * | 8/2018 | Khan | H04W 72/044 |
|---|---|---|---|---|
| 10,075,852 | B2 * | 9/2018 | Nekovee | H04W 16/28 |
| 2013/0072125 | A1 * | 3/2013 | Yoon | H01P 1/10 |
|  |  |  |  | 455/67.11 |
| 2014/0106686 | A1 * | 4/2014 | Higgins | H04B 1/40 |
|  |  |  |  | 455/78 |

(Continued)

*Primary Examiner* — Devan Sandiford
(74) *Attorney, Agent, or Firm* — Michael A. Rahman

(57) ABSTRACT

A method of wireless communication includes transmitting in a downlink direction on a licensed millimeter wave band, by a radio base station, a first millimeter wave band signal at high transmit equivalent isotropically radiated power (EIRP) using a multiple input multiple output transmit antenna array. The method includes receiving by a communications device the first millimeter wave band signal. The method includes transmitting in an uplink direction on an unlicensed millimeter wave band, by the communications device, a second millimeter wave band signal at low transmit equivalent isotropically radiated power (EIRP) using a multiple input multiple output transmit antenna array. The method includes receiving on the unlicensed millimeter wave band, by the radio base station, the second millimeter wave band signal at a high receive gain using a multiple input multiple output receive antenna array.

26 Claims, 11 Drawing Sheets

(56) References Cited

U.S. PATENT DOCUMENTS

| | | | | |
|---|---|---|---|---|
| 2014/0375528 A1* | 12/2014 | Ling | ...................... | H01Q 15/02 |
| | | | | 343/912 |
| 2015/0085683 A1* | 3/2015 | Sadek | ................... | H04W 16/14 |
| | | | | 370/252 |
| 2015/0085792 A1* | 3/2015 | Reddy | ................... | H04L 5/0098 |
| | | | | 370/329 |
| 2015/0180114 A1* | 6/2015 | Achour | ................. | H01Q 1/246 |
| | | | | 455/500 |
| 2015/0180120 A1* | 6/2015 | Pietraski | ............ | H01Q 15/0086 |
| | | | | 342/368 |
| 2015/0373584 A1* | 12/2015 | Hong | ................... | H04W 28/08 |
| | | | | 370/329 |
| 2016/0219487 A1* | 7/2016 | Khawer | ................ | H04W 48/14 |
| 2016/0219589 A1* | 7/2016 | Khawer | ............ | H04W 72/0453 |
| 2016/0353467 A1* | 12/2016 | Nekovee | ............... | H04L 5/0048 |
| 2017/0311168 A1* | 10/2017 | Khawer | ................ | H04W 16/14 |
| 2017/0311191 A1* | 10/2017 | Khawer | ................ | H04W 16/14 |
| 2017/0339717 A1* | 11/2017 | Futaki | ................... | H04W 16/14 |
| 2018/0035487 A1* | 2/2018 | Khan | ..................... | H04B 7/02 |
| 2018/0132108 A1* | 5/2018 | Taori | .................... | H04W 16/14 |
| 2018/0146350 A1* | 5/2018 | Khan | ..................... | H04W 4/20 |
| 2018/0176897 A1* | 6/2018 | Khan | ................. | H04W 72/044 |

* cited by examiner

MILLIMETER WAVE WIRELESS SYSTEM USING LICENSED AND UNLICENSED FREQUENCY SPRECTRUM

CROSS-REFERENCE TO RELATED APPLICATION

This application claims priority to U.S. Provisional Patent Application No. 62/369,038, filed Jul. 30, 2016, and entitled "A MILLIMETER WAVE WIRELESS SYSTEM USING LICENSED AND UNLICENSED FREQUENCY SPECTRUM" which is hereby incorporated by reference in its entirety.

BACKGROUND

The invention relates to wireless communications, and in particular relates to a millimeter wave wireless system using licensed and unlicensed frequency spectrum.

DESCRIPTION OF THE RELATED ART

Currently, wireless access methods are based on two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems. The 4G LTE systems on the other hand provide wide area long-range connectivity both outdoors and indoors using dedicated infrastructure such as cell towers and backhaul to connect to the Internet.

As more people connect to the Internet, increasingly chat with friends and family, watch videos, listen to streamed music, and indulge in virtual or augmented reality, data traffic continues to grow at unprecedented rates. In order to address the continuously growing wireless capacity challenge, the next generation of LAN and WAN systems are expected to rely on higher frequencies referred to as millimeter waves in addition to currently used frequency bands below 6 GHz. Table 1 provides examples of millimeter wave bands.

TABLE 1

Examples of millimeter wave bands

| Bands [GHz] | Frequency [GHz] | Bandwidth [GHz] |
| --- | --- | --- |
| 24 GHz Bands | 24.25-24.45 | 0.200 |
|  | 25.05-25.25 | 0.200 |
| LMDS Band | 27.5-28.35 | 0.850 |
|  | 29.1-29.25 | 0.150 |
|  | 31-31.3 | 0.300 |
| 39 GHz Band | 38.6-40 | 1.400 |
| 37/42 GHz Bands | 37.0-38.6 | 1.600 |
|  | 42.0-42.5 | 0.500 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

TABLE 1-continued

SUMMARY

According to disclosed embodiments, a radio base station includes a transmitter configured to transmit a first millimeter wave band signal at a high transmit equivalent isotropically radiated power (EIRP). The transmitter includes a first signal processing circuit configured to generate the first millimeter wave band signal and a power amplifier configured to amplify the first millimeter wave band signal. The transmitter also includes a high gain transmit antenna array configured to transmit the first millimeter wave band signal. The radio base station also includes a receiver configured to receive a second millimeter wave band signal at a high receive gain. The receiver also includes a high receive gain antenna array configured to receive the second millimeter wave band signal and a low noise amplifier configured to amplify the second millimeter wave band signal. The receiver also includes a second signal processing circuit configured to process the second millimeter wave band signal.

According to some disclosed embodiments, the first millimeter wave band signal is in a licensed frequency spectrum, and the second millimeter wave band signal is in an unlicensed frequency spectrum.

According to some disclosed embodiments, the high gain transmit antenna array is a multiple input multiple output (MIMO) transmit antenna array configured to transmit multiple spatial streams in the licensed millimeter wave spectrum, and the high receive gain antenna array is a multiple input multiple output receive antenna array configured to receive multiple spatial streams in the unlicensed millimeter wave spectrum.

According to disclosed embodiments, a communications device includes a transmitter configured to transmit a first millimeter wave band signal at a low transmit equivalent isotropically radiated power (EIRP). The transmitter includes a first signal processing circuit configured to generate the first millimeter wave band signal and a power amplifier configured to amplify the first millimeter wave band signal. The transmitter also includes a low gain transmit antenna array configured to transmit the first millimeter wave band signal. The communications device includes a receiver configured to receive a second millimeter wave band signal at a low receive gain. The receiver includes a low receive gain antenna array configured to receive the second millimeter wave band signal and a low noise amplifier configured to amplify the second millimeter wave band signal. The receiver includes a second signal processing circuit configured to process the second millimeter wave band signal.

According to disclosed embodiments, a method of data transmission in a downlink direction from a radio base station to a communications device in a wireless network includes transmitting in the downlink direction, by the radio base station, a request to send (RTS) signal on a licensed millimeter wave band, and receiving by the communications device the RTS signal. The method includes, responsive to receiving the RTS signal, transmitting in an uplink direction, by the communications device, a clear to send (CTS) signal on an unlicensed millimeter wave band, and receiving by the radio base station the CTS signal. The method includes responsive to receiving the CTS signal, transmitting data in the downlink direction by the radio base station on the licensed millimeter wave band, and receiving the data by the communications device. The method includes transmitting by the communications device, in response to receiving the data, an acknowledgment (ACK) signal on the unlicensed millimeter wave band.

According to disclosed embodiments, a method of data transmission in an uplink direction from a communications device to a radio base station in a wireless network includes transmitting in the uplink direction, by the communications device, a request to send (RTS) signal on an unlicensed millimeter wave band, and receiving by the radio base station the RTS signal. The method includes in response to receiving the RTS signal, transmitting in a downlink direction, by the radio base station, a clear to send (CTS) signal on a licensed millimeter wave band, and receiving by the communications device the CTS signal. The method includes in response to receiving the CTS signal, transmitting data in the uplink direction by the communications device on the unlicensed millimeter wave band, and receiving the data by the radio base station. The method includes transmitting by the radio base station, in response to receiving the data, an acknowledgment (ACK) signal on the licensed millimeter wave band.

According to disclosed embodiments, a method includes generating, by a radio base station, a first millimeter wave band signal and amplifying the first millimeter wave band signal. The method includes transmitting in a downlink direction on a licensed millimeter wave band, by the radio base station, the first millimeter wave band signal at high transmit equivalent isotropically radiated power (EIRP) using a multiple input multiple output transmit antenna array. The method includes receiving on an unlicensed millimeter wave band, by the radio base station, a second millimeter wave band signal at a high receive gain using a multiple input multiple output receive antenna array and amplifying and processing the second millimeter wave band signal.

According to disclosed embodiments, a method includes generating, by a communications device, a first millimeter wave band signal and amplifying the first millimeter wave band signal. The method includes transmitting in an uplink direction on an unlicensed millimeter wave band, by the communications device, the first millimeter wave band signal at low transmit equivalent isotropically radiated power (EIRP) using a multiple input multiple output transmit antenna array. The method includes receiving on the unlicensed millimeter wave band, by a radio base station, the first millimeter wave band signal at a high receive gain using a multiple input multiple output receive antenna array, and amplifying and processing the first millimeter wave band signal.

DETAILED DESCRIPTION

According to disclosed embodiments, a wireless system uses licensed millimeter wave frequency spectrum in the downlink direction from access points or base stations to communication devices and uses shared or unlicensed millimeter wave frequency spectrum in the uplink direction from the communication devices to the access points or base stations. The access points or base stations implement high-gain antenna array and use high-power amplifiers to achieve high transmit equivalent isotropically radiated power (EIRP) allowed on the licensed spectrum. The high EIRP from the access points or base stations increase signal strength in the direction of targeted communication devices which permits implementation of simple, low-power and small form factor receivers in the communication devices.

In the uplink direction, the communication devices transmit at low EIRP in compliance with the spectrum sharing rules of unlicensed frequency spectrum. The low EIRP limit allows communication devices to implement simple, low-power and small form-factor radio transmitters. The access point implements high-gain receive antenna array and highly sensitive receivers to compensate for the low EIRP from communication devices in the uplink.

Figure 1:
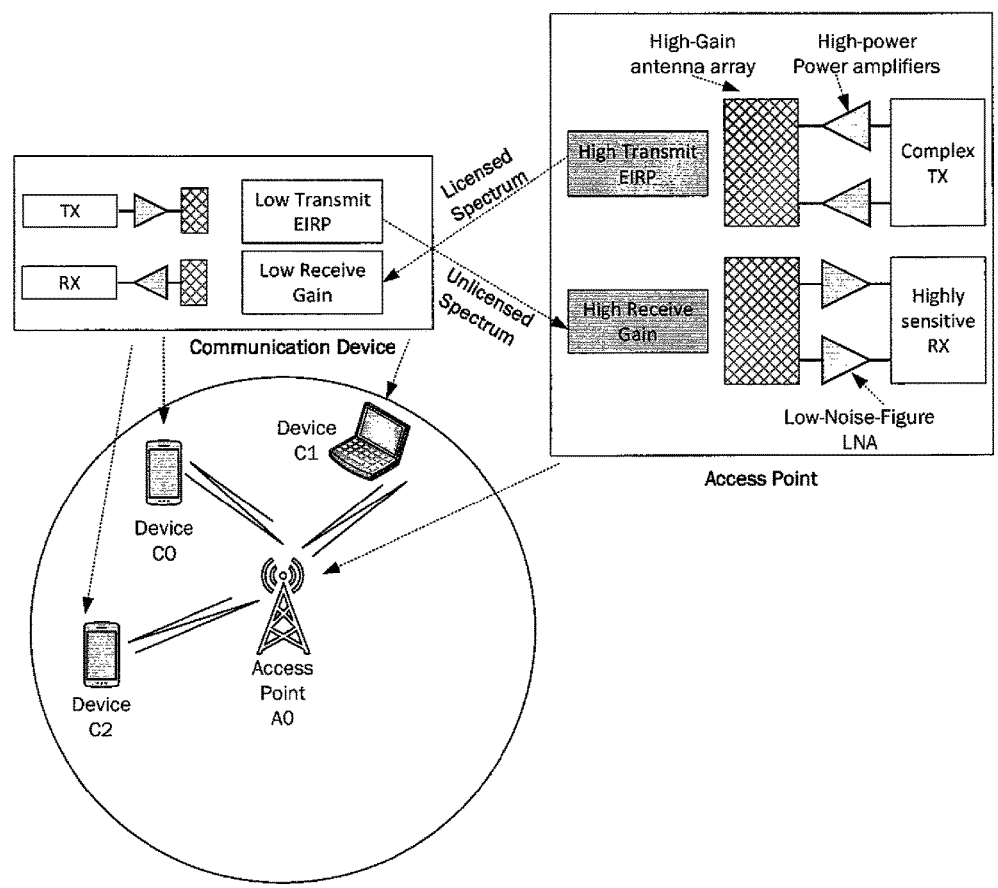
FIG. 1 illustrates an exemplary wireless system in accordance with disclosed embodiments.

FIG. 1 illustrates a wireless system 100 in accordance with disclosed embodiments. The wireless system 100 includes an access point or base station A0 that communicates with communication devices C0, C1 and C2. The communication devices may, for example, be smartphones, laptop computers, desktop computers, augmented reality/virtual reality (AR/VR) devices or any other communication devices. The "access points" and "base stations" are used interchangeably in this document. The wireless system 100 uses licensed millimeter wave spectrum in the downlink direction from the access point or base station to the communications device, and uses shared or unlicensed millimeter wave spectrum in the uplink direction from the communications device to the access point or base station. In some exemplary embodiments, a signal transmission bandwidth of 100 MHz is used, however other transmission bandwidths may be selected.

Figure 2:
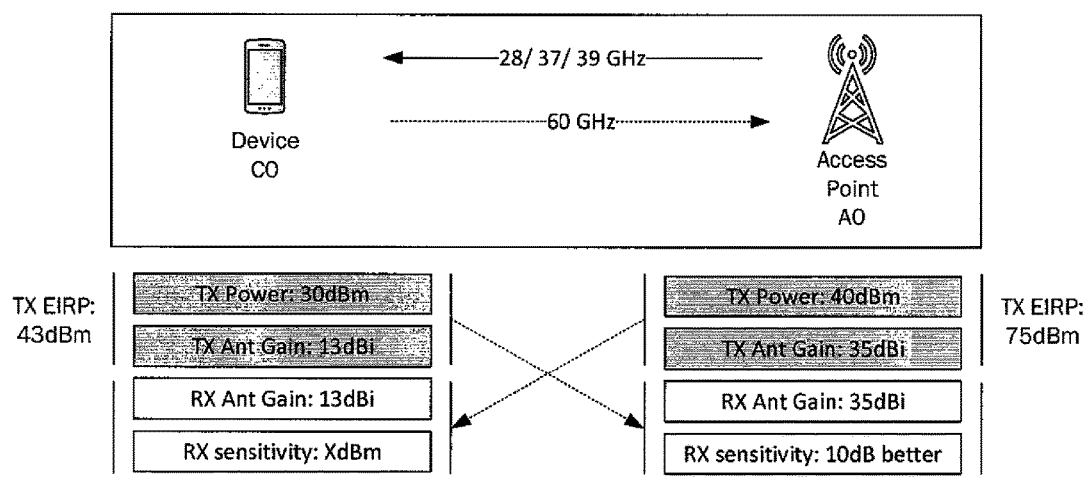
FIG. 2 illustrates an exemplary communication between an access point or base station and a communications device.

FIG. 2 illustrates an exemplary communication between the access point or base station A0 and the communications device C0 according to some disclosed embodiments. In the downlink direction, the access point or base station A0 uses maximum 75 dBm EIRP which is achieved by 40 dBm of transmit power generated by power amplifiers and 35 dBi antenna array gain. The downlink signal is received by the communication device C0 with another 13 dBi antenna array gain for a receiver with xdBm sensitivity. In the uplink direction, the communication device C0 uses maximum 43 dBm EIRP which is achieved by 30 dBm of transmit power generated by power amplifiers and 13 dBi antenna array gain. The uplink signal is received by the access point or base station A0 with another 35 dBi antenna array gain for a receiver with 10 dB better sensitivity than the device or mobile station receiver. The total combined transmit and receive antenna gains in both the downlink and uplink directions are 48 dBi.

However, the transmit power of the communication device C0 is only 30 dBm which is 10 dB lower compared to the 30 dBm transmit power of the access point 104. The lower transmit power is compensated by a 10 dB higher sensitivity of the access point 104's receiver. This higher sensitivity can be achieved by using complex Low-Noise-Amplifiers (LNA) with lower Noise-Figure (NF), sophisticated filtering, interference cancellation and other signal processing methods.

As illustrated in FIG. 1, downlink is one-to-many system while uplink is many-to-one system. Thus, a single access point or base station serves many communication devices. Consequently, the cost, power consumption, form-factor and overall complexity of the access point or base station can be much higher compared to the communication devices. Thus, as illustrated in FIG. 1, the access point or base station A0 implements high transmit EIRP, high receive gain, high gain antenna array, and high-power amplifiers, while the communication devices C0, C1, C2 implement low transmit EIRP and low receive gain.

Figure 3:
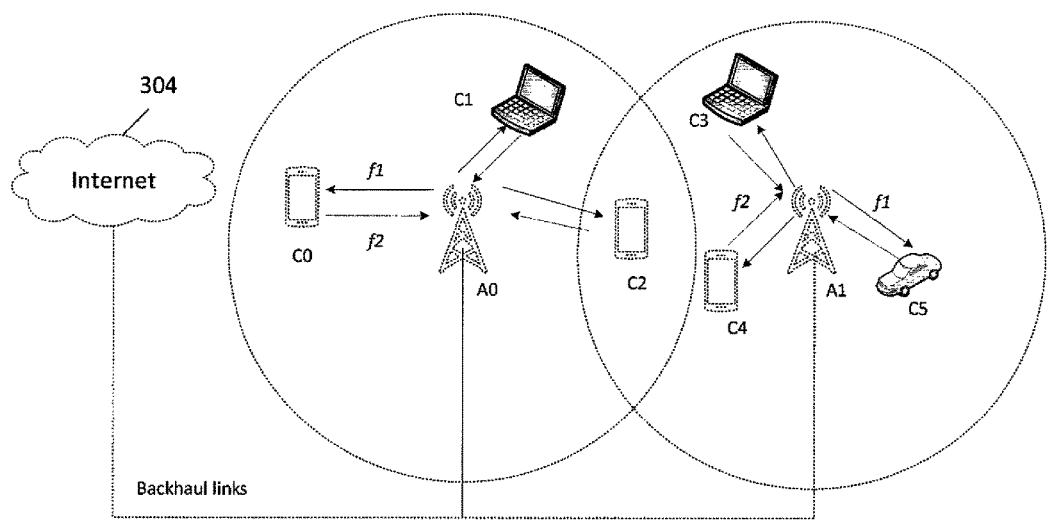
FIG. 3 illustrates an exemplary wireless network in accordance with disclosed embodiments.

FIG. 3 illustrates an exemplary wireless network 300 in accordance with disclosed embodiments. The wireless network 300 uses frequency $f_1$ at the licensed millimeter wave bands such as 28, 37 and 39 GHz bands in the downlink direction and uses frequency $f_2$ in the unlicensed millimeter wave bands such as the 60 GHz band in the uplink direction.

The wireless network 300 includes access points A0 and A1 which are connected to the Internet 304 using a wired link such as, for example, Gigabit/s optical fiber link. The wireless access point A0 provides services to the communication devices C0, C0 and C2 on a first frequency $f_1$ at the licensed millimeter wave bands such as 28, 37 and 39 GHz bands on the downlink and a second frequency $f_2$ in the unlicensed millimeter wave bands such as the 60 GHz band on the uplink. Similarly, the access point A1 provides services to the communication devices C3, C4 and C5 on a first frequency $f_1$ at the licensed millimeter wave bands such as 28, 37 and 39 GHz bands on the downlink and a second frequency $f_2$ in the unlicensed millimeter wave bands such as the 60 GHz band on the uplink.

Figures 4A, 4B:
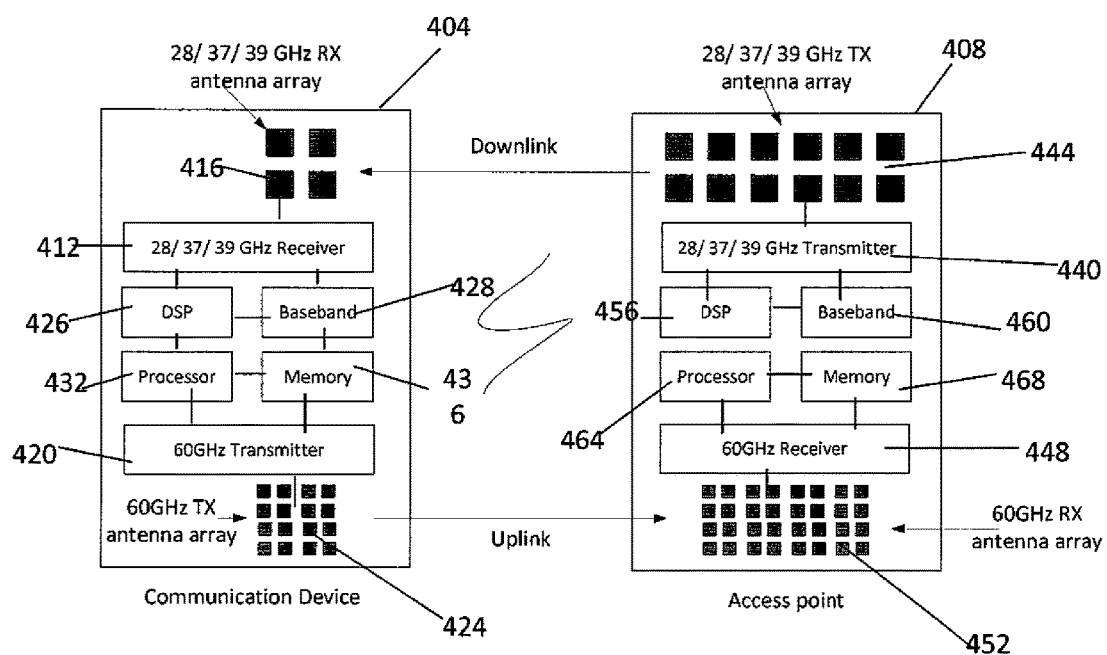
FIGS. 4A and 4B illustrate a communications device and an access point in accordance with some disclosed embodiments.

FIGS. 4A and 4B illustrate a communications device 404 and an access point 408, respectively, in accordance with some disclosed embodiments. Referring to FIG. 4A, the communication device 404 includes a millimeter wave band receiver 412 coupled to a receive antenna array 416. The receiver 412 and the receive antenna array 416 are configured to operate at one or more of the licensed bands such as 28, 37 and 39 GHz licensed bands. The communication device 404 also includes a millimeter wave band transmitter 420 coupled to a transmit antenna array 424 configured to operate at unlicensed or shared band such as the 60 GHz band.

The communication device 404 performs various other functions including baseband processing, digital signal processing and communications protocol processing. Accordingly, the communication device 404 includes a digital signal processor 424, a baseband processor 428, a CPU 432 and a memory 436.

Referring to FIG. 4B, the access point 408 includes a millimeter wave band transmitter 440 coupled to a transmit antenna array 444 configured to operate at one or more licensed bands such as 28, 37 and 39 GHz licensed bands. The access point 408 also includes a millimeter wave band receiver 448 coupled to a receive antenna array 452 configured to operate at unlicensed or shared band such as the 60 GHz band. The access point 408 performs various other functions including, among others, baseband processing, digital signal processing and communications protocol processing. Accordingly, the access point 408 includes a digital signal processor 456, a base band processor 460, a CPU 464 and a memory 468.

Figure 5:
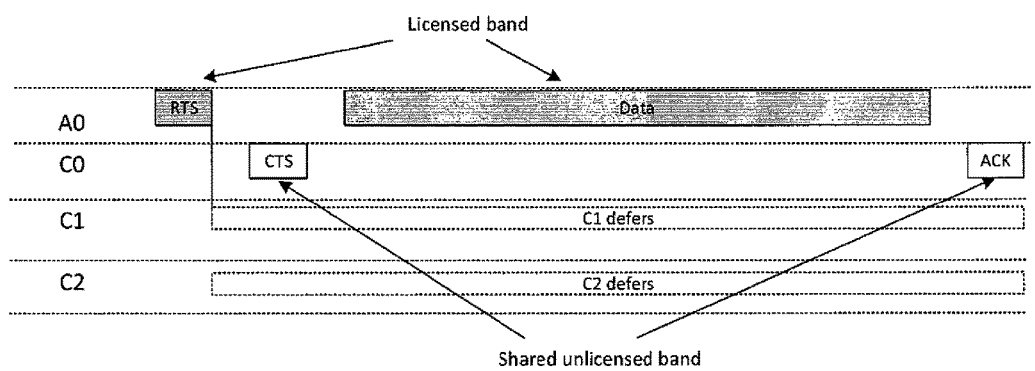
FIGS. 5-7 illustrate exemplary transmission and reception according to disclosed embodiments.

FIG. 5 illustrates an exemplary data transmission on the downlink direction on the licensed band according to some disclosed embodiments. The downlink data transmission uses a Request to Send/Clear to Send (RTS/CTS) protocol. In the example illustrated in FIG. 5, the access point A0 sends RTS (Request to Send) signal to the communication device C0 on one of the millimeter wave licensed bands such as 28, 37 and 39 GHz licensed bands. As all communication devices implement millimeter wave licensed band receivers, the RTS (Request to Send) signal is received by all the three communication devices C0, C1 and C2 in the coverage area of the access point A0. After receiving and determining that RTS is not targeted at the communication devices C1 and C2, these two devices (C1 and C2) defer channel sensing and set their network allocation vector (NAV) which is used to inform how long the current node transmitting RTS/CTS (Request to Send/Clear to Send) signal will need the channel.

The communication device C0 determines that the RTS (Request to Send) signal is targeted at it and responds back to the access point A0 with a CTS (Clear to Send) signal at unlicensed or shared band such as the 60 GHz band. After receiving the CTS (Clear to Send) signal, the access point A0 starts transmitting data to the communication device C0. If there are other communications devices in the system contending for the unlicensed spectrum, they will also overhear CTS (Clear to Send) on the unlicensed or shared band and defer their transmissions for the duration indicated in the network allocation vector (NAV) field of the CTS (Clear to Send) signal. After the data transfer is complete, the communication device C0 sends an acknowledgment (ACK) signal to the access point A0 on unlicensed or shared band such as the 60 GHz band.

Figure 6:
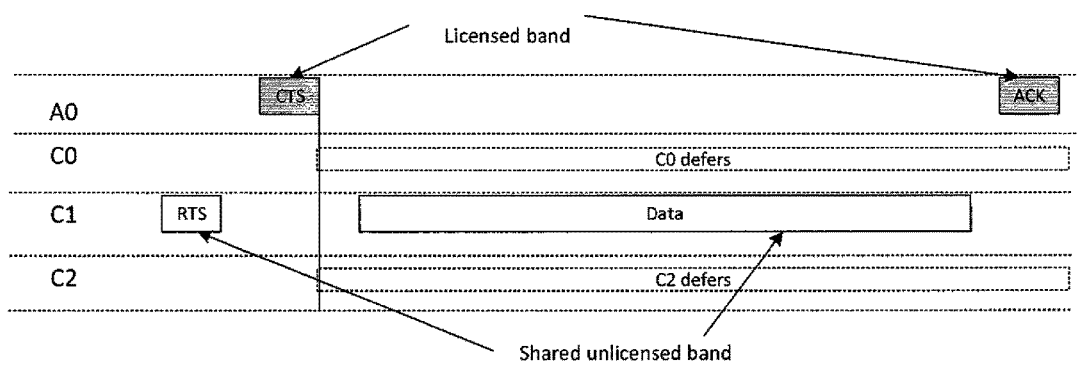

FIG. 6 illustrates an exemplary data transmission on the uplink direction on the unlicensed band according to some disclosed embodiments. The uplink data transmission also uses a Request to Send/Clear to Send (RTS/CTS) protocol.

Before data transmission commences, the communication device C1 sends RTS (Request to Send) signal to the access point A0 on unlicensed or shared spectrum such as the 60 GHz band. All the other nodes (e.g., access points or base stations) in the system contending for the unlicensed spectrum will overhear RTS (Request to Send) signal on unlicensed or shared band and defer their transmissions for the duration indicated in the network allocation vector (NAV) field of the RTS (Request to Send) signal.

After receiving the RTS (Request to Send) signal from communication device C1, the access point A0 responds with a CTS (Clear to Send) signal at one of the millimeter wave licensed bands such as 28, 37 and 39 GHz licensed bands. After receiving the CTS (Clear to Send) signal, the communication device C1 starts sending data to the access point on unlicensed or shared spectrum such as the 60 GHz band. The communication devices C0 and C2 will also hear the CTS (Clear to Send) signal at one of the millimeter wave licensed bands such as 28, 37 and 39 GHz licensed bands and defer their transmission for the duration indicated in the network allocation vector (NAV) field of the CTS (Clear to Send) signal.

After the data transfer is complete, the access point A0 sends an acknowledgment (ACK) signal to the communication device C1 on one of the millimeter wave licensed bands such as 28, 37 and 39 GHz licensed bands.

Figure 7:
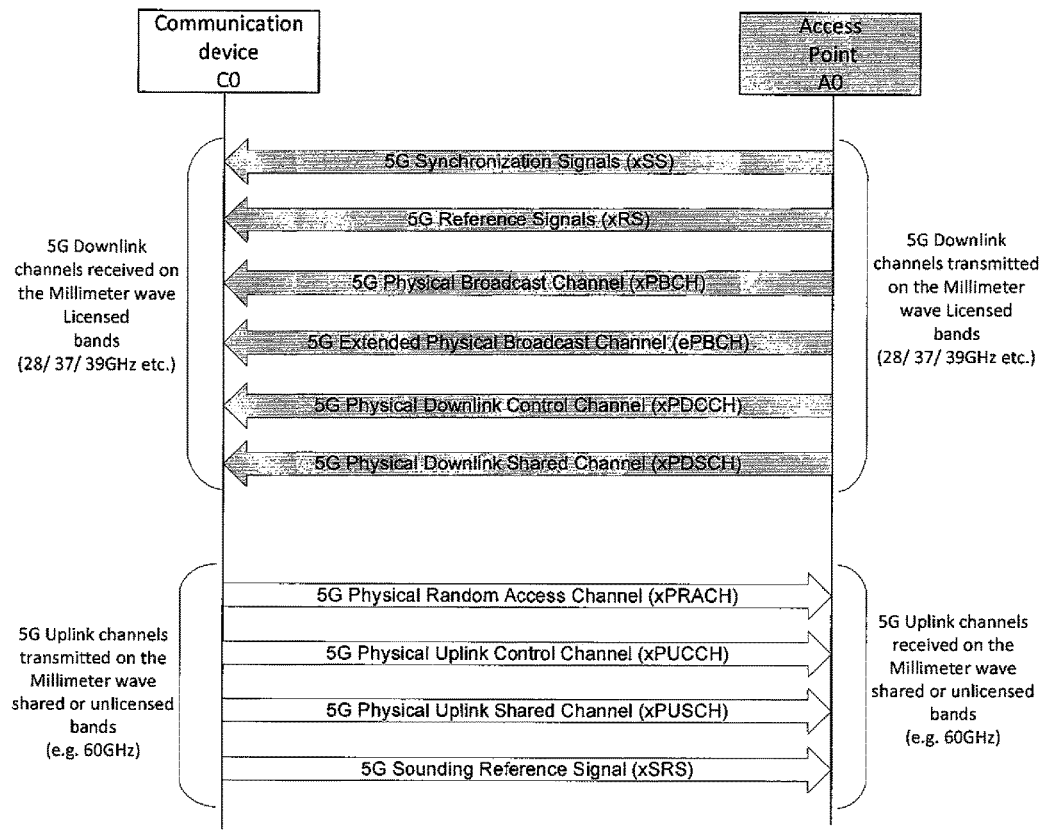

FIG. 7 illustrates 5G signals and Physical channels transmission and reception on the downlink and the uplink directions. The downlink signals such as a synchronization signal and a reference signal are transmitted by the access point A0 on one of the millimeter wave licensed bands such as 28, 37 and 39 GHz licensed bands. These signals are received by the communication device C0 and are used for time and frequency synchronization and channel estimation. The physical channels transmitted by the access point A0 on one or more of the millimeter wave licensed bands such as 28, 37 and 39 GHz licensed bands include the 5G Physical Downlink Shared Channel (xPDSCH), the 5G Physical Downlink Control Channel (xPDCCH), the 5G Physical Broadcast Channel (xPBCH), and the 5G Extended Physical Broadcast Channel (ePBCH).

The uplink signals transmitted by the communication device C0 on unlicensed or shared spectrum such as the 60 GHz band include the 5G Sounding Reference Signal (xSRS), which is received by the access point A0 on unlicensed or shared spectrum such as the 60 GHz band and is used for uplink channel quality estimates. The physical channels transmitted by the communication device C0 on the unlicensed or shared spectrum such as the 60 GHz band include the 5G Physical Random Access Channel (xPRACH), the 5G Physical Uplink Shared Channel (xPUSCH), and the 5G Physical Uplink Control Channel (xPUCCH).

Figure 8:
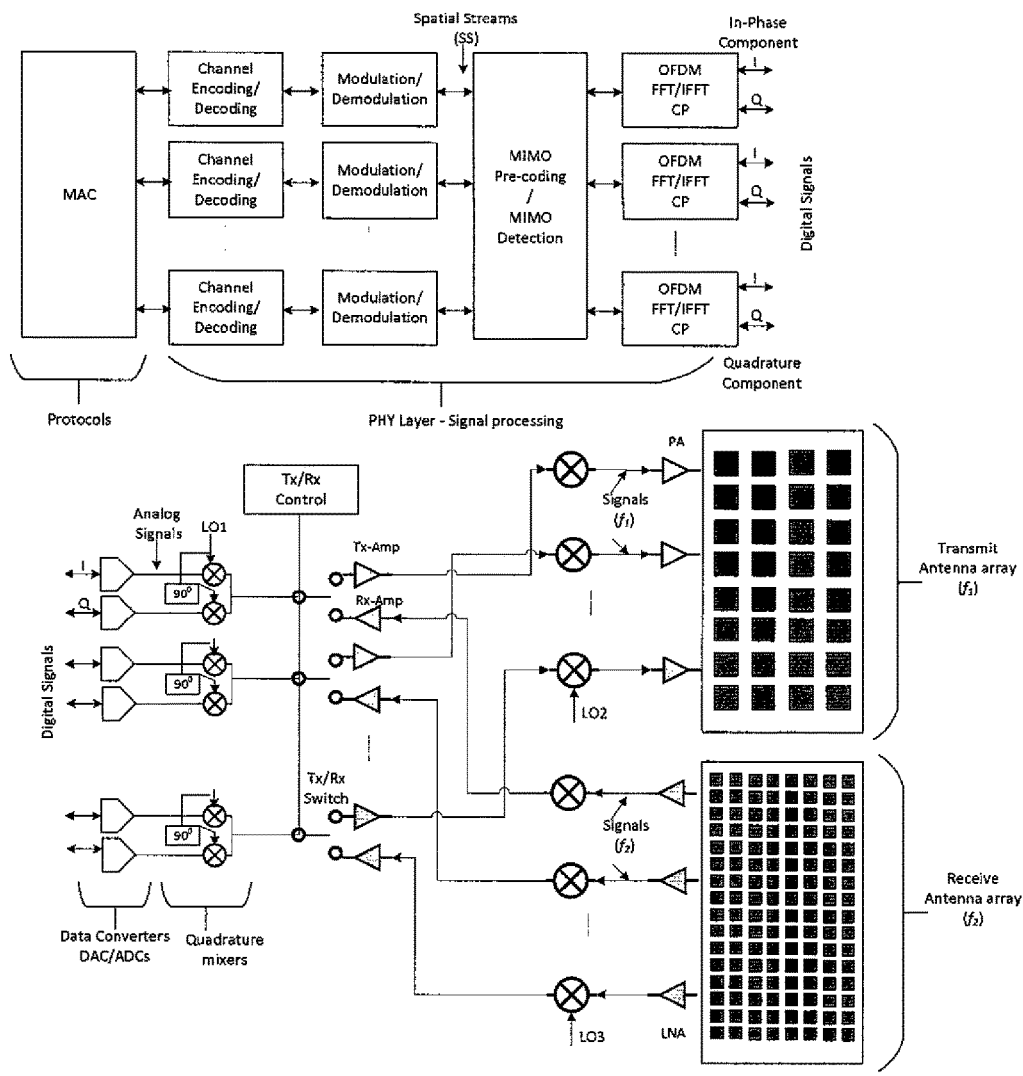
FIGS. 8-11 illustrate exemplary communications chains according to disclosed embodiments.

In one exemplary embodiment illustrated in FIG. 8, the access points A0, A1 implement communication chains for transmission at licensed millimeter wave bands such as 28, 37 and 39 GHz bands and communication chains for reception at unlicensed millimeter wave bands such as the 60 GHz band. The Medium Access Control (MAC) and Physical (PHY) layer waveform used for the licensed and unlicensed bands can be the same or different. In other cases, some of the Medium Access Control (MAC) and Physical (PHY) layer functions can be the same between the licensed bands and unlicensed bands and some other functions can be dedicated to the frequency band. The common Physical (PHY) layer functions, among others, include the channel encoding and decoding scheme such as low-density parity check (LDPC) codes, modulation and demodulation schemes such as BPSK, QPSK, 16-QAM, 64-QAM and 256-QAM, MIMO precoding and detection schemes, and the multiple access scheme such as orthogonal frequency division multiplexing (OFDM).

In the system shown in FIG. 8, a first frequency $f_1$ at licensed millimeter wave bands such as 28, 37 and 39 GHz licensed bands is used in the transmit direction and a second frequency $f_2$ at unlicensed Millimeter wave bands such as the 60 GHz band is used in the receive direction. In the transmit direction, the physical layer provides the digital baseband In-Phase (I) and Quadrature (Q) signals that are converted into analog baseband In-Phase (I) and Quadrature (Q) signals using a set of digital-to-analog converters (DACs). The analog baseband In-Phase (I) and Quadrature (Q) signals are modulated using a set of quadrature modulators or quadrature mixers driven by a first Local Oscillator (LO1) generating a set of signals at an intermediate frequency $f_{IF}$. In other embodiments, a direct-conversion transmitter that modulates analog baseband In-Phase (I) and Quadrature (Q) signals directly to a frequency $f_1$ at licensed Millimeter wave bands such as 28, 37 and 39 GHz licensed bands is implemented.

These signals at frequency $f_{IF}$ can optionally be amplified by a set of transmit amplifiers (Tx-Amp) operating at frequency $f_{IF}$. The control function sends a signal to the switches to enable connection to the mixers driven by a second local oscillator (LO2) that convert the signals to a frequency $f_1$ at licensed Millimeter wave bands such as 28, 37 and 39 GHz. These signals are amplified by the power amplifiers operating at frequency $f_1$ and transmitted on the antenna array operating at frequency $f_1$. In other embodiments, analog phase shifters can be used to appropriately phase rotate the signals before transmission on the antenna array operating at frequency $f_1$.

To receive signals in the receive direction at frequency $f_2$ in the unlicensed Millimeter wave bands such as the 60 GHz band, control function sends a signal to the switches to enable connections to the receive amplifiers (Rx-Amp) operating at frequency $f_{IF}$. The signals received at the antenna array operating at frequency $f_2$ in the unlicensed Millimeter wave bands such as the 60 GHz band, are amplified by the low-noise amplifiers (LNAs). A set of mixers driven by a third local oscillator (LO3), convert the signals at frequency $f_2$ in the unlicensed Millimeter wave bands such as the 60 GHz band to the signals at intermediate frequency $f_{IF}$. In other embodiments, analog phase shifters can be used to appropriately phase rotate the received signals at frequency $f_2$ in the unlicensed Millimeter wave bands such as the 60 GHz band before down-conversion to the intermediate frequency $f_{IF}$. In yet other embodiments, the analog phase shifting can be applied to the signals at the intermediate frequency $f_{IF}$.

These received signals at the intermediate frequency $f_{IF}$ are demodulated using a set of quadrature modulators or quadrature mixers driven by a first Local Oscillator (LO1) generating a set of analog baseband In-Phase (I) and Quadrature (Q) signals. The analog baseband In-Phase (I) and Quadrature (Q) signals are converted to digital baseband In-Phase (I) and Quadrature (Q) signals using a set of analog-to-digital converters (ADCs). These digital baseband In-Phase (I) and Quadrature (Q) signals are fed into the physical (PHY) layer where they undergo digital signal processing.

Figure 9:
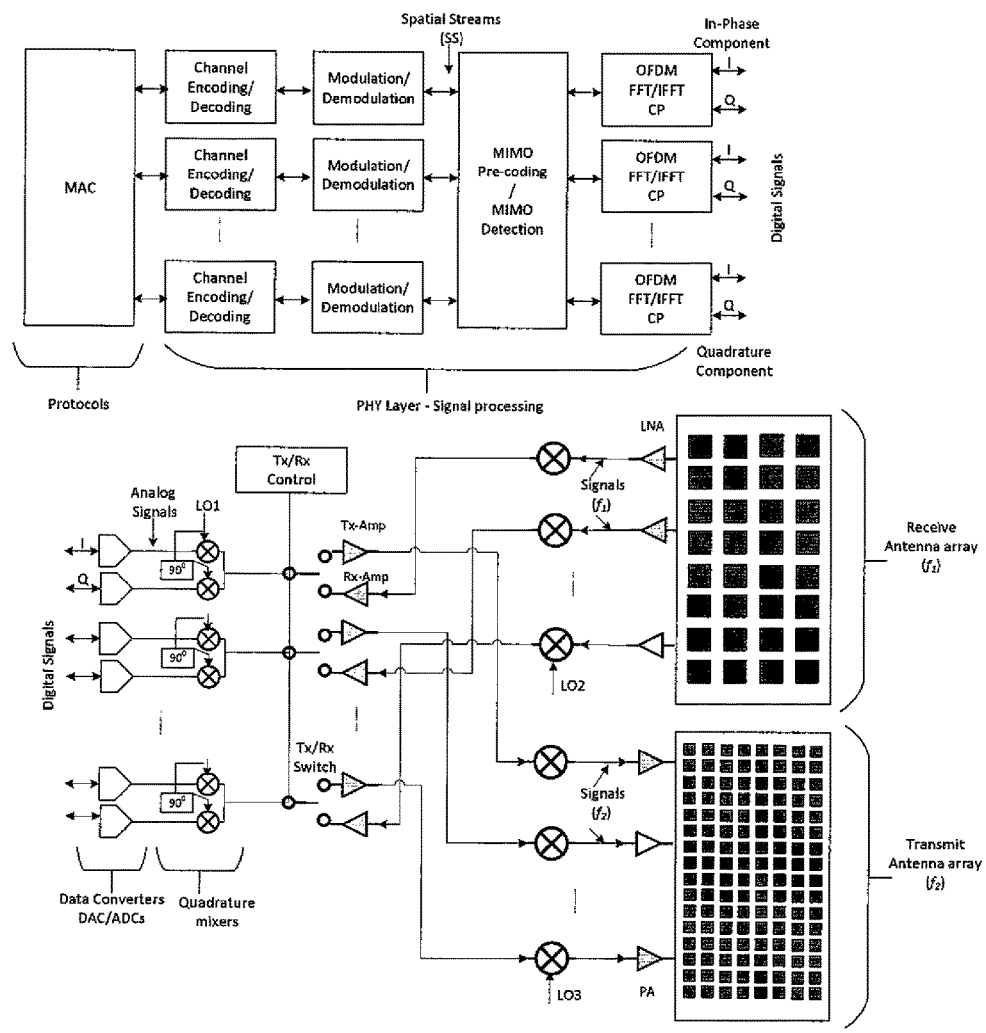

In another exemplary embodiment illustrated in FIG. 9, the communication devices C0, C1, C2, C3, C4 and C5 implement baseband/analog and RF chains for transmission at unlicensed Millimeter wave bands such as the 60 GHz band and baseband/analog and RF chains for reception at licensed Millimeter wave bands such as 28, 37 and 39 GHz bands. The Medium Access Control (MAC) and Physical (PHY) layer waveform used for the licensed and unlicensed bands can be the same or different. In other cases, some of the Medium Access Control (MAC) and Physical (PHY) layer functions can be the same between the licensed bands and unlicensed bands and some other functions can be dedicated to the frequency band. The common Physical (PHY) layer functions, among others, include the channel encoding and decoding scheme such as low-density parity check (LDPC) codes, modulation and demodulation schemes such as BPSK, QPSK, 16-QAM, 64-QAM and 256-QAM, MIMO precoding and detection schemes, and the multiple access scheme such as orthogonal frequency division multiplexing (OFDM).

In the system shown in FIG. 9, a first frequency $f_1$ at licensed millimeter wave bands such as 28, 37 and 39 GHz licensed bands is used in the receive direction and a second frequency $f_2$ at unlicensed millimeter wave bands such as the 60 GHz band is used in the transmit direction. In the transmit direction, the physical layer provides the digital baseband In-Phase (I) and Quadrature (Q) signals that are converted into analog baseband In-Phase (I) and Quadrature (Q) signals using a set of digital-to-analog converters (DACs). The analog baseband In-Phase (I) and Quadrature (Q) signals are modulated using a set of quadrature modulators or quadrature mixers driven by a first Local Oscillator (LO1) generating a set of signals at an intermediate frequency $f_{12F}$. In other embodiments, a direct-conversion transmitter that modulates analog baseband In-Phase (I) and Quadrature (Q) signals directly to frequency $f_2$ at unlicensed millimeter wave bands such as the 60 GHz band is implemented.

These signals at frequency $f_{IF}$ can optionally be amplified by a set of transmit amplifiers (Tx-Amp) operating at frequency $f_{IF}$. The control function sends a signal to the switches to enable connection to the mixers driven by a local oscillator (LO3) that convert the signals to frequency $f_2$ in the unlicensed millimeter wave bands such as the 60 GHz band. These unlicensed millimeter wave band signals are amplified by the power amplifiers operating to frequency $f_2$ and transmitted on the antenna array operating at frequency $f_2$. In other embodiments, analog phase shifters can be used to appropriately phase rotate the signals before transmission on the antenna array operating at to frequency $f_2$.

To receive signals in the receive direction at a frequency $f_1$ at licensed millimeter wave bands such as 28, 37 and 39 GHz, control function sends a signal to the switches to enable connections to the receive amplifiers (Rx-Amp) operating at frequency $f_{IF}$. The signals received at the antenna array operating at frequency $f_1$ in the licensed millimeter wave bands such as 28, 37 and 39 GHz bands are amplified by the low-noise amplifiers (LNAs). A set of mixers driven by a local oscillator (LO2), convert the signals at frequency $f_1$ in the licensed millimeter wave bands to the signals at intermediate frequency $f_{IF}$. In other embodiments, analog phase shifters can be used to appropriately phase rotate the received signals at frequency $f_1$ in the licensed millimeter wave bands before down-conversion to the intermediate frequency $f_{IF}$. In yet other embodiments, the analog phase shifting can be applied to the signals at the intermediate frequency $f_{IF}$.

These received signals at the intermediate frequency $f_{IF}$ are demodulated using a set of quadrature modulators or quadrature mixers driven by a first Local Oscillator (LO1) generating a set of analog baseband In-Phase (I) and Quadrature (Q) signals. The analog baseband In-Phase (I) and Quadrature (Q) signals are converted to digital baseband In-Phase (I) and Quadrature (Q) signals using a set of analog-to-digital converters (ADCs). These digital baseband In-Phase (I) and Quadrature (Q) signals are fed into the physical (PHY) layer where they undergo digital signal processing.

In some implementations, the MAC and PHY layers may be implemented on application-specific integrated circuit (ASIC) system-on-a-chip (SoC). In some implementations, the SoC also includes the digital-to-analog (DAC) and analog-to-digital converter (ADC) functions. In yet other implementations, a radio frequency integrated circuit (RFIC) incorporating quadrature mixers, amplification and filtering functions are also included in the system-on-a-chip (SoC).

Figure 10:
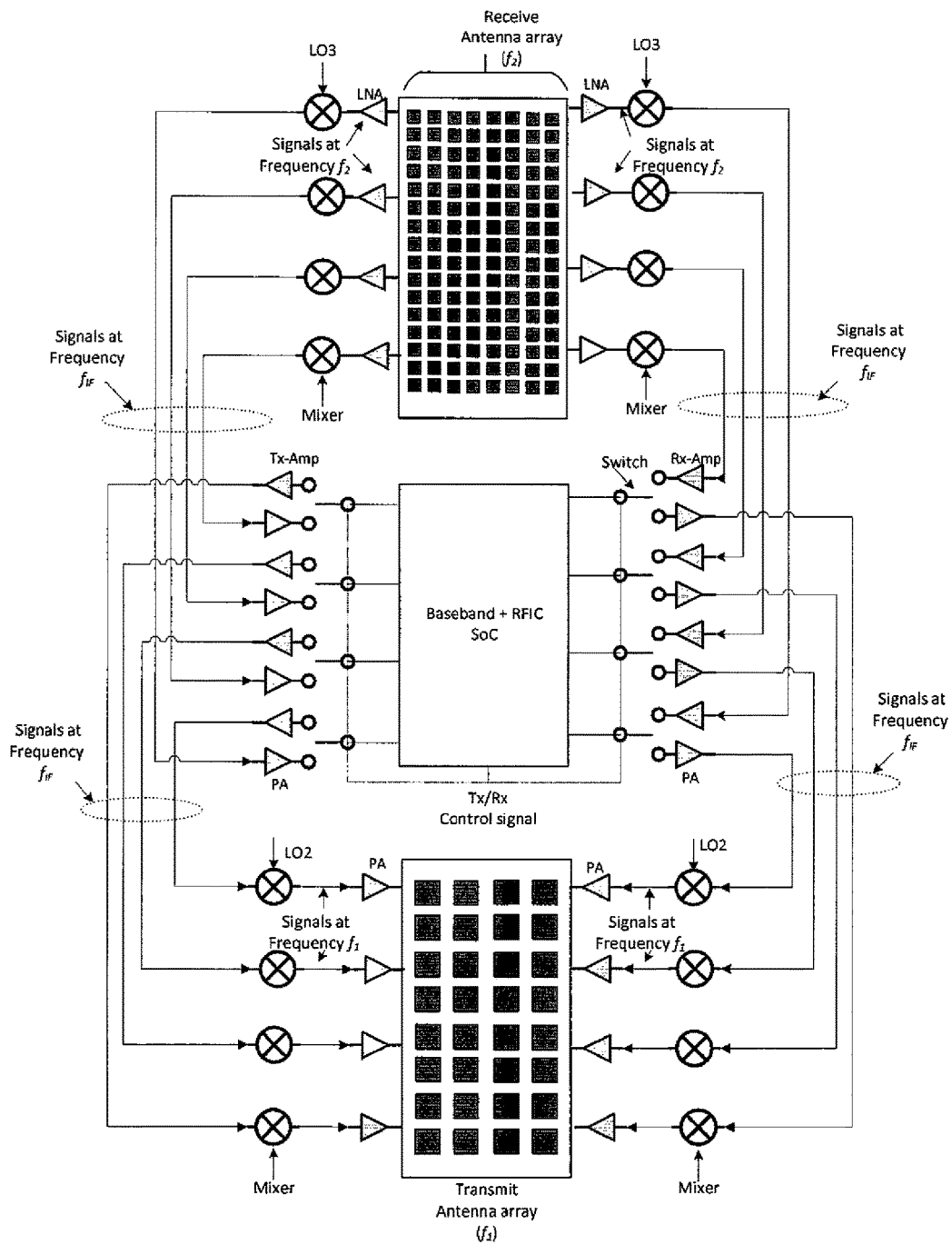

FIG. 10 illustrates multiple input multiple output (MIMO) and beamforming for transmission at licensed bands and reception at unlicensed spectrum bands by the access point or the base station according to the principles of the current invention. In this embodiment, it is generally assumed that the system-on-a-chip (SoC) implements MAC, Physical (PHY) layers as well as a radio frequency integrated circuit (RFIC) including the quadrature mixers. In this case, the signals coming out of the SoC are centered at the intermediate frequency $f_{IF}$.

The SoC can generally support transmission of M multiple input multiple output (MIMO) spatial streams (SS). In the descriptions that follow, we assume the total number of spatial streams supported by the SoC as eight. However, this embodiment should not be construed to limit the scope of the disclosure. In alternate embodiments, the number of spatial streams supported by the SoC can be any integer number.

The SoC also provides a signal to switch between the transmit and receive modes. The signals at frequency $f_{IF}$ out of the SoC can optionally be amplified by using a set of transmit amplifiers (Tx-Amp). In the transmit mode, the transmit/receive control function in the SoC sends a signal to the switches to enable connection to the transmit amplifiers (Tx-Amp) operating at frequency $f_{IF}$. The mixers driven by a second local oscillator (LO2) convert the signals to a frequency $f_1$ at the licensed Millimeter wave bands such as 28, 37 and 39 GHz bands. These signals are amplified by the power amplifiers operating at frequency $f_1$ and transmitted on the antenna array operating at frequency $f_1$.

To receive signals in the receive direction at frequency $f_2$ in the unlicensed Millimeter wave bands such as the 60 GHz band, transmit/receive control function in the SoC sends a signal to the switches to enable connections to receive amplifiers (Rx-Amp) operating at frequency $f_{IF}$. The signals received at the antenna array operating at frequency $f_2$ in the unlicensed Millimeter wave bands such as the 60 GHz band are amplified by the low-noise amplifiers (LNAs) operating at frequency $f_2$. The mixers driven by a second local oscillator (LO3) convert the received signals at frequency $f_2$ in the unlicensed Millimeter wave bands such as the 60 GHz band to an intermediate frequency $f_{IF}$. These signals are optionally amplified by a set of receive amplifiers (Rx-Amp) operating at frequency $f_{IF}$ and fed into the SoC.

Figure 11:
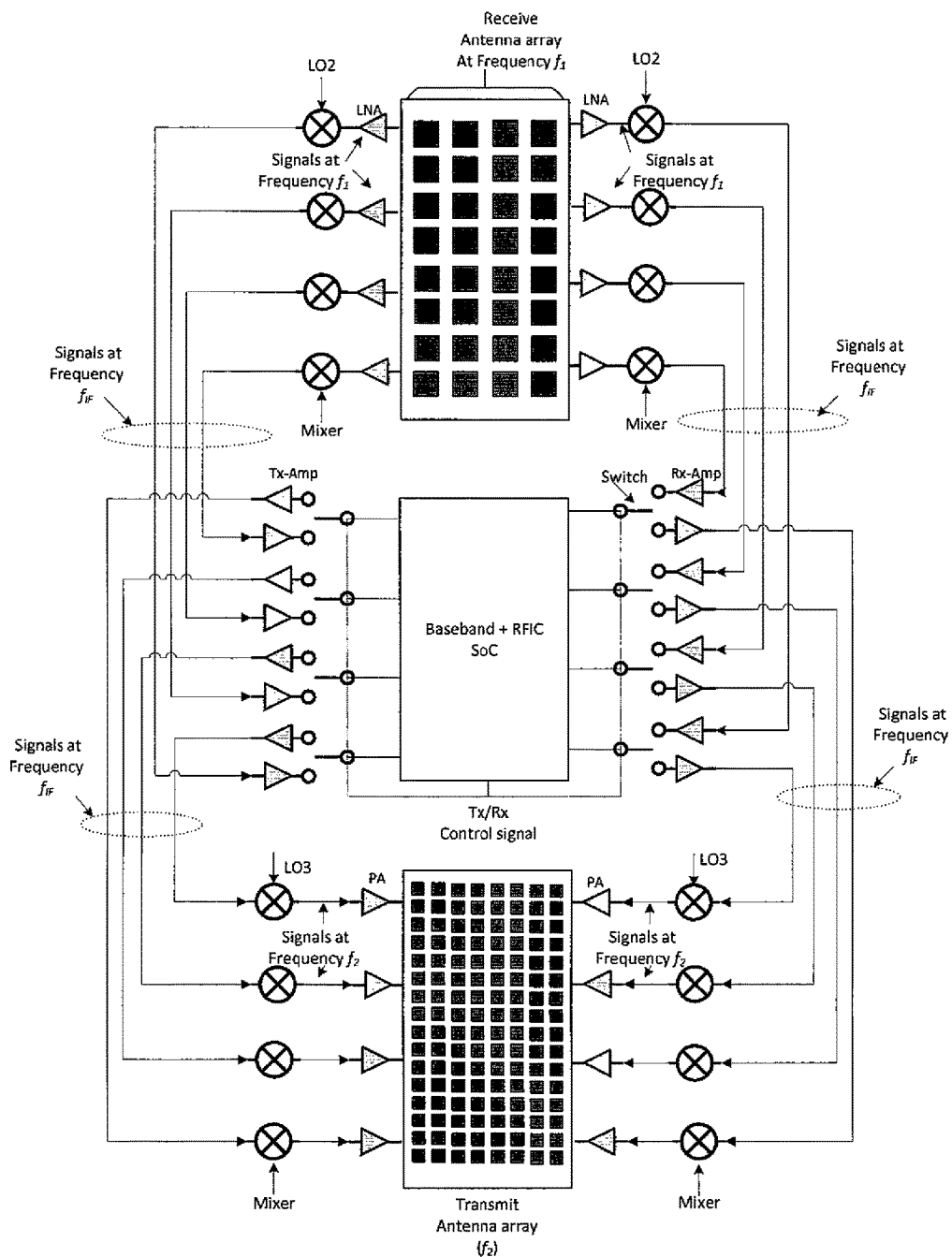

FIG. 11 illustrates multiple input multiple output (MIMO) and beamforming for transmission at unlicensed bands such as the 60 GHz band and reception at licensed Millimeter wave spectrum such as 28, 37 and 39 GHz bands by the communication device according to the principles of the current invention. In the transmit mode, the transmit/receive control function in the SoC sends a signal to the switches to enable connection to the transmit amplifiers (Tx-Amp) operating at frequency $f_{IF}$. The mixers driven by a second local oscillator (LO3) convert the signals to a frequency $f_2$ at unlicensed bands such as the 60 GHz band. These signals are amplified by the power amplifiers operating at frequency $f_2$ and transmitted on the antenna array operating at frequency $f_2$.

To receive signals in the receive direction at frequency $f_1$ at licensed Millimeter wave spectrum such as 28, 37 and 39 GHz bands, transmit/receive control function in the SoC sends a signal to the switches to enable connections to receive amplifiers (Rx-Amp) operating at frequency $f_{IF}$. The signals received at the antenna array operating at frequency $f_1$ in the licensed Millimeter wave spectrum such as 28, 37 and 39 GHz bands are amplified by the low-noise amplifiers (LNAs) operating at frequency $f_1$. The mixers driven by a second local oscillator (LO2) convert the received signals at frequency $f_1$ in the licensed Millimeter wave spectrum such as 28, 37 and 39 GHz bands to an intermediate frequency $f_{IF}$. These signals are optionally amplified by a set of receive amplifiers (Rx-Amp) operating at frequency $f_{IF}$ and fed into the SoC.

In the disclosed embodiments, it has generally been assumed that baseband functions are implemented in an application-specific integrated circuit (ASIC) system-on-a-chip (SoC). In other embodiments, these functions can be implemented on general-purpose processors or in field programmable field-programmable gate array (FPGA) integrated circuits.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

The invention claimed is:

1. A communications device, comprising: a transmitter configured to transmit in an uplink direction a first millimeter wave band signal in an unlicensed frequency spectrum at a low transmit equivalent isotropically radiated power (EIRP), the transmitter comprising: a first signal processing circuit configured to generate the first millimeter wave band signal; a power amplifier configured to amplify the first millimeter wave band signal; a low gain transmit antenna array configured to transmit the first millimeter wave band signal; a receiver configured to receive from the downlink direction a second millimeter wave band signal in a licensed frequency spectrum at a low receive gain, the receiver comprising: a low receive gain antenna array configured to receive the second millimeter wave band signal; a low noise amplifier configured to amplify the second millimeter wave band signal; a second signal processing circuit configured to process the second millimeter wave band signal.

2. The communications device of claim 1, wherein the licensed millimeter wave spectrum transmission is in the 28, 37 or 39 GHz bands.

3. The communications device of claim 1, wherein the unlicensed millimeter wave spectrum is in the 60 GHz band.

4. The communications device of claim 1, wherein the communications device is a mobile phone.

5. The communications device of claim 1, wherein the communications device is an augmented reality/virtual reality (AR/VR) device.

6. The communications device of claim 1, wherein the communications device is a computer.

7. A method comprising: generating, by a communications device, a first millimeter wave band signal; amplifying the first millimeter wave band signal; transmitting in an uplink direction on an unlicensed millimeter wave band, by the communications device, the first millimeter wave band signal at low transmit equivalent isotropically radiated power (EIRP) using a multiple input multiple output transmit antenna array; receiving from the downlink direction on the licensed millimeter wave band, from a radio base station, a second millimeter wave band signal at a low receive gain; and processing the second millimeter wave band signal.

8. The method of claim 7, wherein the licensed millimeter wave band is 28, 37 or 39 GHz licensed bands.

9. The method of claim 7, wherein the unlicensed millimeter wave band is 60 GHz unlicensed band.

10. A user equipment (UE), comprising:
a transmitter configured to transmit first millimeter wave band signals in an unlicensed frequency spectrum at a low transmit equivalent isotropically radiated power (EIRP), wherein the first millimeter wave band signals include indications of at least one of 5G sounding reference signal (5G SRS), 5G physical random access channel (5G PRACH), 5G physical uplink control channel (5G PUCCH), and 5G physical uplink shared channel (5G PUSCH); and
a receiver configured to receive second millimeter wave band signals in a licensed frequency spectrum using a low receive gain antenna array, wherein the first and second millimeter wave band signals have different frequencies, and wherein the second millimeter wave band signals include indications of at least one of 5G synchronization signal (5G SS), 5G reference signal (5G RS), 5G physical broadcast channel (5G PBCH), 5G physical downlink control channel (5G PDCH), and 5G physical downlink shared channel (5G PDSCH).

11. The UE of claim 10, wherein the licensed millimeter wave spectrum is in the 28, 37 or 39 GHz bands.

12. The UE of claim 10, wherein the unlicensed millimeter wave spectrum is in the 60 GHz band.

13. The UE of claim 10, wherein the UE is a mobile phone.

14. The UE of claim 10, wherein the UE is an augmented reality/virtual reality (AR/VR) device.

15. The UE of claim 10, wherein the UE is a computer.

16. The UE of claim 10, wherein the UE is a customer premise equipment (CPE).

17. The UE of claim 10, wherein the second millimeter wave band signals are transmitted from an associated radio base station or access point.

18. A method for wireless communication, comprising:
transmitting by a user equipment (UE) first millimeter wave band signals in an unlicensed frequency spectrum at a low transmit equivalent isotropically radiated power (EIRP), wherein the first millimeter wave band signals include indications of at least one of 5G sounding reference signal (5G SRS), 5G physical random access channel (5G PRACH), 5G physical uplink control channel (5G PUCCH), and 5G physical uplink shared channel (5G PUSCH); and
receiving at the UE second millimeter wave band signals in a licensed frequency spectrum using a low receive gain antenna array, wherein the first and second millimeter wave band signals have different frequencies, and wherein the second millimeter wave band signals include indications of at least one of 5G synchronization signal (5G SS), 5G reference signal (5G RS), 5G physical broadcast channel (5G PBCH), 5G physical downlink control channel (5G PDCH), and 5G physical downlink shared channel (5G PDSCH).

19. The method of claim 18, wherein the second millimeter wave band signals are transmitted by an associated radio base station or an access point at a high transmit equivalent isotropically radiated power (EIRP).

20. The method of claim 18, wherein the licensed millimeter wave spectrum is in the 28, 37 or 39 GHz bands.

21. The method of claim 18, wherein the unlicensed millimeter wave spectrum is in the 60 GHz band.

22. The method of claim 18, further comprising:
   transmitting by the UE a request to send (RTS) signal on the unlicensed millimeter wave band;
   receiving by the UE a clear to send (CTS) signal on the licensed millimeter wave band; and
   in response to receiving the CTS signal, transmitting data by the UE on the unlicensed millimeter wave band.

23. The method of claim 18, wherein the UE is a mobile phone.

24. The method of claim 18, wherein the UE is an augmented reality/virtual reality (AR/VR) device.

25. The method of claim 18, wherein the UE is a computer.

26. The method of claim 18, wherein the UE is a customer premise equipment (CPE).

* * * * *